United States Patent [19]
Abbott

[11] 3,823,613
[45] July 16, 1974

[54] VARIABLE RATIO TRACTION DRIVE
[75] Inventor: Randle Leslie Abbott, Tamworth, England
[73] Assignee: GKN Transmission Limited, Birmingham, England
[22] Filed: Dec. 8, 1972
[21] Appl. No.: 313,567

[30] Foreign Application Priority Data
Dec. 8, 1971 Great Britain.................... 56892/71

[52] U.S. Cl.................................. 74/200, 74/691
[51] Int. Cl...................... F16h 15/38, F16h 37/06
[58] Field of Search............................. 74/200, 691

[56] References Cited
UNITED STATES PATENTS
2,014,920  9/1935  Almen et al. ......................... 74/200
2,646,696  7/1953  Kepes ................................. 74/200
3,494,224  2/1970  Fellows et al. ........................ 74/691
3,684,065  8/1972  Scheifer ........................... 74/691 X Primary Examiner—Samuel Scott
Assistant Examiner—P. S. Lall
Attorney, Agent, or Firm—Spencer & Kaye

[57] ABSTRACT

The specification discloses a traction drive of separately variable form comprising first and second discs having torodial surfaces with first rollers between the surfaces whose inclination can be varied to vary the ratio of the drive. Two races are rigidly connected to the first and second discs and there are second rollers between the races. The second rollers are either frusto conical or of barrel shape. The rotary axes of the second roller lie on an imaginary conical surface having at its axis the rotary axis of the disc. The rotation of the second disc is derived solely from its engagement with the first and second rollers.

3 Claims, 3 Drawing Figures

VARIABLE RATIO TRACTION DRIVE

BACKGROUND OF THE INVENTION

1. Field of the Invention

This invention relates to traction drives of steplessly variable drive ratio and is particularly, but not exclusively, concerned with such drives for use in automotive vehicles.

2. Description of the Prior Art

A traction drive with which the invention is concerned includes a unit of the type comprising driving and driven co-axial discs, hereinafter referred to as torus discs, having toroidal surfaces which are arranged in face-to-face relation and are engaged by rollers which, when the discs are urged together, transmit motion of the driving torus disc to the driven torus disc. By varying the angles of inclination of the rotary axes of the rollers with respect to a plane perpendicular to the axis of rotation of the discs the drive ratio of the unit may be varied in a stepless manner. The inclination of the rotary axes of the rollers may be controlled automatically in dependence on the power or torque of a prime mover connected to the drive or there may be a manual control or, more usually, there is both a manual and an automatic control for the inclination of the rotary axes of the rollers.

It is an object of the present invention to provide a simple and efficient form of traction drive of steplessly-variable drive ratio.

SUMMARY OF THE INVENTION

According to the invention we provide a traction drive of steplessly-variable drive ratio comprising an input member, an output member, first and second co-axial torus discs, the first disc having a driving connection with one of the members, a number of first rollers mounted between the discs, means to apply a force to urge the toroidal surfaces on said discs into engagement with the first rollers, means to vary the angles of inclination of the rotary axes of the first rollers relative to planes perpendicular to the rotary axis of the discs to vary the relative speeds of the discs, and a combined thrust bearing and differential mechanism comprising two races rigidly connected respectively to the first and second discs and presenting opposed raceways, a plurality of second rollers between and engaging the raceways so as to transmit said force and arranged with their rotary axes lying in an imaginary conical surface of which the axis is the rotary axis of the discs, the raceways having bearing surfaces which are surfaces of revolution about the rotary axis of the discs, each bearing surface being formed by rotating about said axis either a straight line inclined to said axis or a circular arc which is concave towards said imaginary conical surface and whose chord is inclined to said axis, the radius of the arc being greater than the perpendicular distance between the arc and said imaginary conical surface a carrier for said second rollers and having a driving connection with the other of said members, and rotary bearing means for each second roller supported on the carrier and located in mutually spaced relation, the second torus disc deriving its rotational movement solely from the first and second rollers.

In operation of the drive, the second rollers have to withstand high forces, i.e. high end-loads and centrifugal and gyroscopic forces. We have found that the use of balls and rollers mounted in cages is not satisfactory because of the high frictional forces between the balls or rollers and the cage. These frictional forces make the drive inefficient and also cause the drive to have a short life because the cages and the rollers or balls are rapidly worn. This problem is accentuated because, at least for automotive work, it is required that the second rollers provide a comparatively high step-up ratio which means that their rotary axes must be inclined at a steep angle to the rotary axis of the discs.

We have found that this problem can, in part, be solved by mounting each of the second rollers on its own bearing means supported on the carrier. These bearing means prevent there being excessive wear between the rollers and the carrier and also prevent wear and inefficiency. Moreover, when necessary, i.e. when the raceways are conical, the bearing means may be designed to withstand the end loads on the second rollers.

In the small space which is often available, we have found that it is not practicable to arrange the bearing means for the second rollers so that such bearing means can withstand the high gyroscopic and centrifugal forces. We have therefore designed the drive in such a manner that the centrifugal and gyroscopic forces are reacted on the raceways and not on the bearings of the second rollers. Thus with either form of raceway the gyroscopic forces tending to rotate the second rollers about axes perpendicular to their rotary axes is reacted by the raceways.

The bearing means for each second roller comprises a pin supported by the carrier and an anti-friction bearing between the pin and the roller. Each pin may be hollow and arranged to receive oil by splash to lubricate the roller on the pin.

In a preferred arrangement, the first disc is fixed to a shaft which carries one of said races which engages an abutment on the shaft. If a positive neutral is desired at least one of said driving connections may be made to be capable of disconnection.

According to a further feature of a preferred form of traction drive, said force-applying means comprises a piston and cylinder arrangement associated with one of the torus discs. Thus the toroidal surface may be formed on a piston which is mounted in a cylinder connected to one of the members, means being provided for preventing relative rotation between the piston and the cylinder and means being provided for introducing hydraulic or other fluid into the space between the piston and the cylinder to apply said force.

One arrangement embodying the invention uses step-up gearing between a prime mover and the input member so that the torus disc connected to the input member rotates in the opposite direction to the engine output shaft and at a speed higher than the engine output shaft.

In another arrangement the torus disc connected to the input member rotates in the same direction and the same speed as the prime mover and there is a step-up drive unit between the carrier for the second rollers and the output member.

BRIEF DESCRIPTION OF THE DRAWINGS

Two embodiments of the invention will now be described in detail by way of example with reference to the accompanying drawings in which.

DESCRIPTION OF THE PREFERRED EMBODIMENTS

Figure 1:
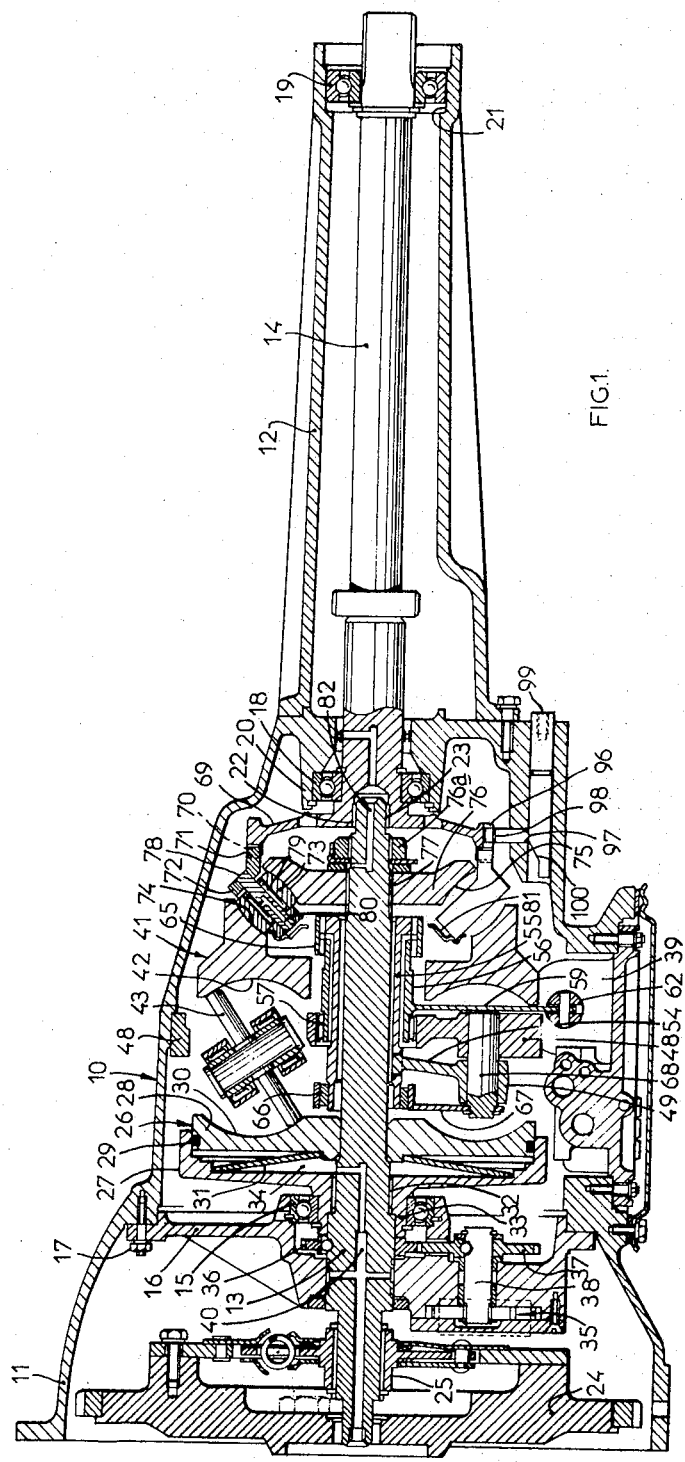
FIG. 1 is a vertical section of a traction drive constituting a first embodiment of the invention.
Figure 2:
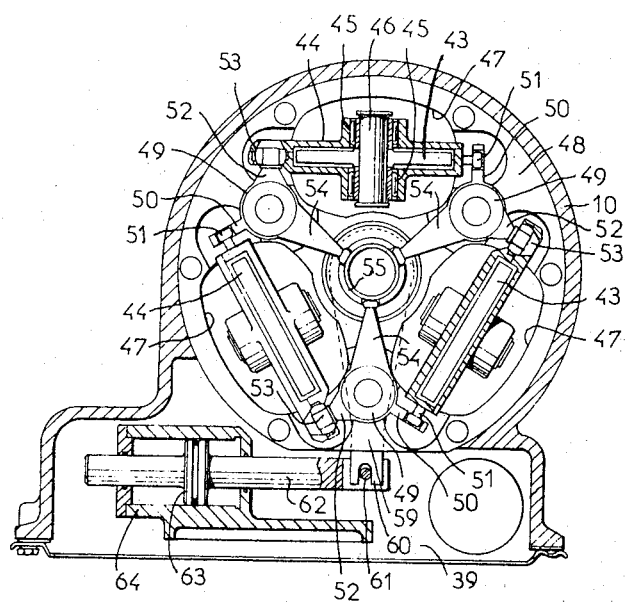
FIG. 2 is a composite transverse section of FIG. 1 showing the means for varying the inclinations of the first rollers.

Referring now to FIGS. 1 and 2, the drive comprises a housing indicated generally at 10 and having a bell-end 11 at one end and having secured thereto a tail-housing 12 at the other end thereof. The drive comprises an input member in the form of a shaft 13 and an output member in the form of a shaft 14. The in put shaft 13 is supported in a bearing 15 in a web member 16 which seals the central part of the housing 10 and is secured thereto by set pins and nuts indicated at 17. The output member or shaft 14 is supported in bearings 18 and 19. The bearing 18 is supported in a hollow spigot 20 at the right hand end of the housing 10 and is held in position by circlips. The bearing 19 is held in a bore 21 at the right hand end of the tail-housing 12. The left hand end of the shaft 14 is provided with a counterbore 22 in which a reduced section end of the input shaft 13 is mounted by means of needle rollers 23.

The input member or shaft 13 is arranged to be driven from a prime mover, not shown, by means of a gear 24 which is mounted on the left hand end of the shaft 13 by means of a spring center of conventional construction and indicated at 25.

A first torus disc is indicated generally at 26 and comprises an annular cylinder member 27 in which is received an annular piston 28 carrying a ring seal 29 which engages with the internal wall of the cylinder. The piston 28 has an external toroidal surface 30. The piston is urged to the right in FIG. 1 by means of a spring 31 received in the cylinder and which is in the form of a Belleville washer. The cylinder member 27 is splined to the shaft 13 at 32 and has a collar 33 which is received in the bearing 15 so that the shaft 13 is supported indirectly in the bearing 15 by means of the collar.

Hydraulic fluid can be introduced into the cylinder 34 within the cylinder member 27 through drillings in the shaft 13. The hydraulic fluid is supplied from an oil pump indicated generally at 35 which is mounted in the web member 16 and which is driven via gears 36 and 37 on the shaft 13 and an oil pump shaft 38 respectively. The pump 35 draws oil from a sump 39 at the bottom of the housing 10 and delivers it into drillings 40 in the shaft 13 which communicate with the cylinder 34.

A second torus disc is indicated generally at 41 and has a toroidal surface 42. It will be noted that the toroidal surfaces 30 and 42 face one another and there are three first rollers 43 which are interposed between, and engage, the surfaces 30 and 42.

Referring particularly to FIG. 2, each roller 43 is mounted in a carrier 44. Each carrier is provided with two opposed roller bearings 45 in which the ends of a shaft 46 to which the roller 43 is secured are mounted.

The rollers 43 with their housings 44 are mounted in apertures 47 in a plate 48 secured within the housing.

Rotatably mounted on the plate 48 are three three-armed levers 49. Each lever has a first arm 50 having an aperture in which a projection 51 at one end of a carrier 44 is received. Each lever has a second arm 52 whose end is received in a spherical bearing 53 at the other end of each carrier 44. Each lever 49 has a third arm 54 whose inner end is engaged in a recess in a sleeve 55 which surrounds the shaft 13. When the sleeve is rotated the arms 54 and thus the levers 49 are also rocked, thus to change the inclinations of the rotary axes of the rollers 43.

Rocking of the sleeve 55 is effected by a further sleeve 56 which surrounds the sleeve 55 and is mounted in a bearing 57 in the plate 48. The sleeve 56 has a depending arm 59 which has a bifurcated end 60 to receive a pin 61 on a piston rod 62. The piston rod carries a piston 62 within a cylinder 64. An internally splined collar 65 engages external splines on the sleeves 55 and 56 thus connecting the sleeves together for rotation. The left hand end of the sleeve 55 is held in a bearing 66 supported by a plate 67 mounted on the pivot pins 68 of the arms 49 and not shown in FIG. 2.

It will be seen from the foregoing that longitudinal movement of the piston 63 within the cylinder 64 will rock the arms 59 and thus the sleeves 55 and 56 which in turn will rock the levers 49 to vary the inclinations of the rotary axes of the rollers 43 relative to planes perpendicular to the rotary axis of the coaxial torus discs 26 and 41.

The output member or shaft 14 has, at its left hand end, a flange 69 provided with a plurality of axially extending teeth 70. These teeth engage with teeth 71 on a carrier 72 for a series of second rollers. One of these rollers is indicated at 73 and is interposed between a raceway 74 formed on the second torus disc 41 and a raceway 75 formed on a race 76 which is slined at 77 to the shaft 13. It will be noted that each of the raceways 74 and 75 is a concave surface and is a surface of revolution about the rotary axis of the shafts 13 and 14 and thus of the torus discs 26 and 41. The surfaces are formed by rotating a circular arc about the rotary axis of the shafts 13 and 14, the arc having its chord inclined to the rotary axis.

Each of the rollers 73 is of barrel shape and is mounted on a pin 78 supported on the carrier, needle roller bearings 79 being interposed between the pin and the roller. Each pin has a hollow bore 80 which opens to the bearing 79 and an oil collector 81 is provided to deflect oil splashed outwardly into the bore 80. The race 76 engages an abutment in the form of a nut 76a on the shaft 13. Oil is delivered from a lubrication pump, not shown, into a drilling 82 in the shaft 13 and the oil passes along the transverse drilling and one of the splines 77 is removed so that the oil flows axially along the space left by the removed spline and is picked up by the oil collector 81 and directed into the bores 80 of the bearing pins for the second rollers.

In operation, the input member or shaft 13 is rotated via the gear 24 and the spring centre 25. This causes the cylinder member 27 to rotate and by means, not shown, the piston 28 to rotate. The spring 31 urges the piston 28 to the right and into frictional engagement with the rollers 43 which in turn urge the second torus disc 41 into frictional engagement with the second rollers 73. The rollers are forced into engagement with the raceway 75 on the race 76 and the spring force is reacted by the abutment 76a. As the shaft 13 continues to rotate oil will be delivered from the oil pump 35 into the cylinder 34 and will increase the pressure within the cylinder 34. This pressure will be reacted by the race 76 and the abutment 76a. The rollers 73 with their associated raceways 74 and 75 and the race 76 act as a combined thrust bearing and epicyclic differential gear. The output from the drive is taken through the carrier 72 and the flange 69 to the output shaft or member 14. When the gear is in operation, the rollers 73 have to withstand high loads. There is a centrifugal load which is tending to move the rollers outwardly. This is reacted by the raceway 74 on the second torus disc 41. There is a gyroscopic force tending to rotate the rollers 73 about axes perpendicular to their rotary axes. This force too is reacted by the raceways 74 and 75. Because the rollers 73 are of barrel shape, that is because the centre of curvature of the roller surface is displaced from the rotary axis of the roller the engagement of the raceways and the roller surfaces react the gyroscopic forces without these having to be carried by the bearings 79.

It will be noted that the motion of the second torus disc 41 is derived solely from the rotation of the rollers 43 and 73. The final drive ratio, i.e., the speed of rotation of the roller carrier 72 will depend on the angles of inclination of the rotary axes of the rollers 43 in a known manner and these inclinations will be changed in the manner described above by longitudinal movement of the piston 63 in the cylinder 64.

With the traction drive as thus described, the direction of rotation of the output shaft 14 will be opposite to the direction of rotation of the input shaft 13. For automotive use, therefore, it will either be necessary to have a final drive in the driving axle which is of reverse hand to normal or a separate gear will have to be provided to reverse the direction of rotation of the shaft 14. Such a gear may be incorporated in the drive as will be described with reference to FIG. 3. Alternatively, the drive may be modified by interposing a gear at the forward end of the drive between the prime mover and the input member 13 so that the input member 13 rotates in the opposite direction to the prime mover and preferably at a higher speed than that of the prime mover.

It is preferred that the second rollers 73 be of the shape shown in FIG. 1, because this shape enables the end loads on the second rollers when the drive is in use to be reacted by the raceways 74 and 75 on the second torus disc 41 and the race 76 respectively. If desired, however, the second rollers may be of frusto-conical shape as shown in FIG. 3.

Figure 3:
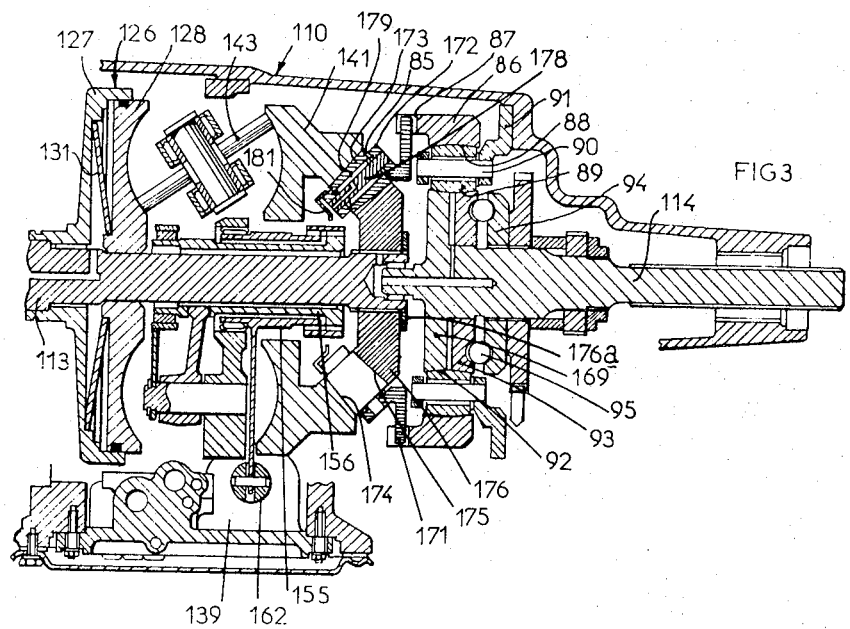
FIG. 3 is a partial section similar to FIG. 1 of a second embodiment of the invention.

Referring now to FIG. 3, corresponding parts in that figure to the parts shown in FIGS. 1 and 2 are indicated by reference numerals which are increased by 100 with respect to those shown in FIGS. 1 and 2.

Referring to FIG. 3, the second rollers 173 are frusto-conical in shape and they engage with the raceways 174 and 175 on the second torus disc and the race 176 respectively. It will be seen that in this construction the raceways 174 and 175 are formed by rotating about the rotary axis of the first and second torus discs 126 and 141; i.e., about the rotary axes of the members 113 and 114, a straight line inclined to the rotary axis.

The bearings 179 between the pins 178 and the rollers 173 will be similar to the bearings 79 but a thrust washer 85 will be provided on each pin to react the end thrust of the roller.

The carrier 172 may be connected directly to the output member or shaft 114 as in the arrangement shown in FIGS. 1 and 2 but in FIG. 3 there is shown a step-up gear between the carrier 172 and the shaft 114. Thus there is an annulus member 86 which has a plurality of axial teeth 87 which engage with axial teeth 171 on the carrier 172. The annulus member has a concave inner surface 88 which is engaged by a series of barrel shaped rollers 89. The rollers are rotatably mounted on pins 90 which are supported in a carrier 91 secured to the housing 110. The output shaft or member 114 is provided with a flange 169 which has a concave outer surface 92 to engage the rollers 89. A disc 93 is also mounted on the output member or shaft 114 as is an abutment 94. Interposed between the disc 93 and the abutment 94 are a series of balls 95 which are arranged in inclined tracks so that upon relative rotation of the disc 93 and the abutment 94 the balls urge the disc 93 to the left thus to grip the rollers 89. The abutment 94 is splined to the output shaft 114.

Operation of the embodiment of FIG. 3 is similar to the operation of the embodiment of FIGS. 1 and 2 in that the drive passes to the carrier 172 in the manner described in relation to the carrier 72 in FIGS. 1 and 2 and the drive then passes through the step-up gear consisting of the annulus 86, the rollers 89 and the flange 169 and disc 93 to the output element or shaft 114. The step-up gear has the effect of increasing the speed of the shaft 114 relative to that of the carrier 172 and also reversing the direction of rotation of the shaft 114 so that the shafts 113 and 114 rotate in the same direction.

For automotive use, it may be desired to have some form of parking brake and such an arrangement is shown in FIG. 1.

Referring to that Figure, the flange 69 is provided with a plurality of external teeth 96. An arm which is pivotally mounted is indicated at 97 and has a tooth 98 which can engage with any one of the teeth 96. The arm 97 is spring loaded to a position out of engagement with the teeth 96 but may be moved into engagement by the longitudinal movement of a rod 99 having a ramp 100 to engage the outer end of the arm 97. When parking is required and the vehicle is stationary, the rod 99 is moved to the position shown in FIG. 1 which causes the teeth 96 and 98 to engage thus to prevent rotation of the shaft 14. During normal running of the vehicle the rod 99 is moved to the right in FIG. 1 thus allowing the arm 97 to move out of engagement with the teeth on the spider 69 under the influence of the spring bias, not shown.

It will be noted that in each embodiment the rotary axis of each of the second rollers 73 and 173 lies on an imaginary conical surface which has as its axis the rotary axis of the shafts 13, 14 and 113 and 114 respectively. It will also be noted that in the embodiment of FIGS. 1 and 2 the radius of curvature of the external surfaces of the rollers 73 is greater than the maximum distance from the rotary axes of the rollers to the surfaces thereof.

Traction drives embodying the invention are efficient since there is virtually no friction loss between the second rollers and the carriers and the centrifugal and gyroscopic forces on the second rollers are reacted by the raceways and not by the bearings, and this enables the

I claim:

1. A traction drive of steplessly-variable drive ratio comprising an input member, an output member, first and second coaxial torus discs, the first disc having a driving connection with one of the members, a number of first rollers mounted between the discs, means to apply a force to urge the toroidal surfaces on said discs into engagement with the first rollers, means to vary the angles of inclination of the rotary axes of the first rollers relative to planes perpendicular to the rotary axis of the discs to vary the relative speeds of the discs, and a combined thrust bearing and differential mechanism comprising two races rigidly connected respectively to the first and second torus discs and presenting opposed raceways, a plurality of second rollers between and engaging the raceways so as to transmit said force and arranged with their rotary axes lying in an imaginary conical surface of which the axis is the rotary axis of the discs, the raceways having bearing surfaces which are surfaces of revolution about the rotary axis of the discs, each bearing surface being formed by rotating about said axis either a straight line inclined to said axis or a circular arc which is concave towards said imaginary conical surface, and whose chord is inclined to said axis, the radius of the arc being greater than the perpendicular distance between the arc and said imaginary conical surface, a carrier for said second rollers, a driving connection between the carrier and the other of said members, and rotary bearing means for the second rollers and located on the carrier in mutually spaced relation, each said bearing means comprising a pin supported by said carrier and an anti-friction bearing between the pin and the second roller supported by the pin, the second torus disc deriving its rotational movement solely from the first and second rollers.

2. A drive according to claim 1 wherein each pin is hollow and arranged to receive oil by splash to lubricate the second roller mounted on the pin.

3. A drive according to claim 1 including a spring-loaded arm arranged to engage external teeth on the output member and spring biased out of engagement with said teeth, means being provided for moving the arm into engagement with the teeth to lock the output member.

* * * * *

UNITED STATES PATENT OFFICE
CERTIFICATE OF CORRECTION

Patent No. 3,823,613                 Dated July 16th, 1974

Inventor(s) Randle Leslie Abbott

It is certified that error appears in the above-identified patent and that said Letters Patent are hereby corrected as shown below:

In the heading of the patent, line 4, change "Transmission" to --Transmissions--. Column 4, line 17, change "62" to --63--; line 37, after "is" change "slined" to --splined--.

Signed and sealed this 19th day of November 1974.

(SEAL)
Attest:

McCOY M. GIBSON JR.           C. MARSHALL DANN
Attesting Officer              Commissioner of Patents